(12) United States Patent
Stewart

(10) Patent No.: US 8,105,045 B2
(45) Date of Patent: Jan. 31, 2012

(54) WIND TURBINE BLADE AND METHOD FOR MANUFACTURING A WIND TURBINE BLADE

(75) Inventor: Ian Stewart, Southampton (GB)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 12/740,848

(22) PCT Filed: Nov. 12, 2008

(86) PCT No.: PCT/DK2008/000398
§ 371 (c)(1),
(2), (4) Date: Apr. 30, 2010

(87) PCT Pub. No.: WO2009/062507
PCT Pub. Date: May 22, 2009

(65) Prior Publication Data
US 2010/0247325 A1   Sep. 30, 2010

(30) Foreign Application Priority Data
Nov. 14, 2007   (DK) .................... 2007 01623

(51) Int. Cl.
*F03D 1/06* (2006.01)
(52) U.S. Cl. .................... 416/229 R; 416/232
(58) Field of Classification Search .............. 416/229 R, 416/226, 232
See application file for complete search history.

(56) References Cited

U.S. PATENT DOCUMENTS

| | | | |
|---|---|---|---|
| 3,133,596 A * | 5/1964 | Berliner | ............ 416/232 |
| 4,339,230 A | 7/1982 | Hill | |
| 4,732,542 A | 3/1988 | Hahn et al. | |
| 4,976,587 A | 12/1990 | Johnston et al. | |

FOREIGN PATENT DOCUMENTS

| | | |
|---|---|---|
| DE | 4225599 A1 | 2/1994 |
| EP | 0037987 A2 | 10/1981 |
| EP | 1310351 A1 | 5/2003 |
| JP | 62282175 A * | 12/1987 |
| WO | 99/43955 A1 | 9/1999 |
| WO | 2007/048408 A1 | 5/2007 |

OTHER PUBLICATIONS

Anders Budtz-Olsen, Office Action issued in related Danish Patent Application No. PA 2007 01623; Jun. 20, 2008; 4 pages; Danish Patent and Trademark Office.
European Patent Office, Search Report and Written Opinion in PCT Application No. PCT/DK2008/000398, Nov. 16, 2009, 13 pages.
European Patent Office, International Preliminary Report on Patentability in PCT Application No. PCT/DK2008/000398, Mar. 29, 2010, 7 pages.

* cited by examiner

*Primary Examiner* — Richard Edgar
(74) *Attorney, Agent, or Firm* — Wood, Herron & Evans, L.L.P.

(57) ABSTRACT

Wind turbine blade includes a first blade part and a second blade part, the blade parts being bonded by bonding means forming a bond. To reduce peel stresses of the bond and reduce the risk of crack formation, an edge portion of the bond is covered by a low elastic modulus adhesive joint bridging a gap between the first blade part and the second blade part.

8 Claims, 2 Drawing Sheets

WIND TURBINE BLADE AND METHOD FOR MANUFACTURING A WIND TURBINE BLADE

BACKGROUND OF THE INVENTION

Figure 1:
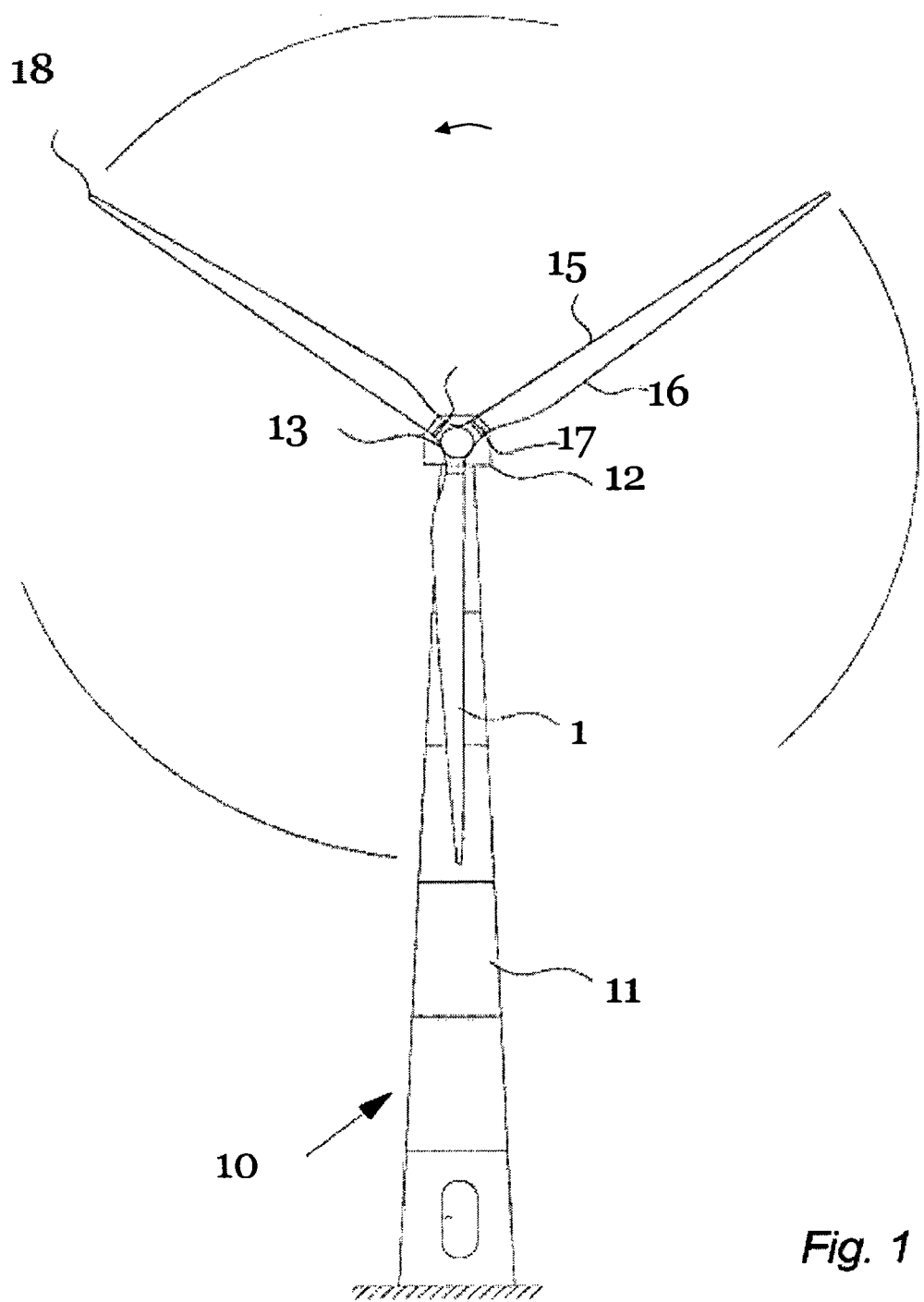

The present invention relates to a wind turbine blade comprising a first blade part and a second blade part, the blade parts being bonded by bonding means forming a bond.

Another aspect of the invention relates to a method for manufacturing a wind turbine blade the method comprising the steps of providing a first blade part and a second blade, and bonding the first and second blade parts by bonding means to form a bond.

Modern wind turbines have grown considerably in size over the last decades, and at present have blades with a length of up to 100 m, and even longer blades can be anticipated in the future. Wind turbine blades are typically arranged in sets of three on a hub to constitute a rotor. The rotor is in turn connected to a main shaft arranged in a nacelle on top of a tower. As an example, a rotor having blades of 100 m sweeps a rotor area of more than 31,000 $m^2$.

With increasing size, the loads on the structure, for example the blades, increase considerably. One reason is that the energy received by the wind turbine increases with the square of the increase in blade length. Further, the wind speed will not be constant all over the rotor, and the blades will be subject to more variance of the wind with increased size of the blades. Local variance of the wind at different positions of the rotor area are due to wind shear, i.e., lower wind speed near the ground than higher up, turbulence, wind shade, etc. All these factors increase fatigue loads and extreme loads on the wind turbine.

In wind turbine blades made up of blade parts, one of the loaded areas is the bond bonding the first and second blade parts.

An object of the invention is to provide a wind turbine blade with increased resistance to loading.

THE INVENTION

According to the invention this object is achieved with a wind turbine blade as outlined in the introduction, wherein an edge portion of the bond is covered by a low elastic modulus adhesive joint bridging a gap between the first blade part and the second blade part. By a low modulus adhesive should be understood an adhesive having an elastic modulus in the range of 0.5 GPa to 1 GPa. By covering the edge portion of the bond with a low elastic modulus joint is achieved that potentially harmful peel stresses are relieved, and the risk of crack initiation at the bond is reduced.

The joint may have a surface contour of any suitable shape as will be appreciated by the skilled person. According to an embodiment, however, the joint has a concave surface contour. Hereby a further reduction of the risk of crack initiation is achieved.

To relieve peel stresses even further, an embodiment prescribes that the bond has a convex surface contour, although other surface contours may be suitable. This surface contour further improves the fatigue performance.

According to an embodiment, the bond is formed by a high modulus adhesive to provide a strong bond between the first and second blade parts. By a high modulus adhesive should be understood an adhesive having an elastic modulus in the range of 1 GPa to 3 GPa.

The invention may be advantageous at any bond of the blade. However according to an embodiment, the bond is arranged at a trailing edge portion of the blade, which is a part of the blade subjected to particularly high stresses, and hence the effect of the invention is particularly high at this part of the blade.

According to an embodiment, the low elastic modulus adhesive has an elastic modulus in the interval of 0.5 GPa to 1 GPa.

An embodiment of the invention relates to a wind turbine comprising at least one blade as outlined above. A wind turbine equipped with blades according to the invention will have a reduced likelihood of in-service failure, and hence the overall economy of the wind turbine will be superior.

The invention further relates to a method for manufacturing a wind turbine blade as outlined in the introduction. The method comprises the further step of covering the bond by a low elastic modulus adhesive joint bridging a gap between the first blade part and the second blade part. This is a relatively simple and cost effective way of providing a blade being less prone to failure due to peeling stress of the bond.

According to an embodiment, the joint is applied using a shaper tool adapted for providing a concave surface contour of the joint. As will be envisaged by the skilled person some advantageous effect may be achieved irrespective of the shape of the surface contour of the joint. However it is expected that reverse orientation of the fillet radius provides a better fatigue performance. With the above method step is provided a relatively simple and cost effective way of providing a concave surface of the joint.

Figure 2:
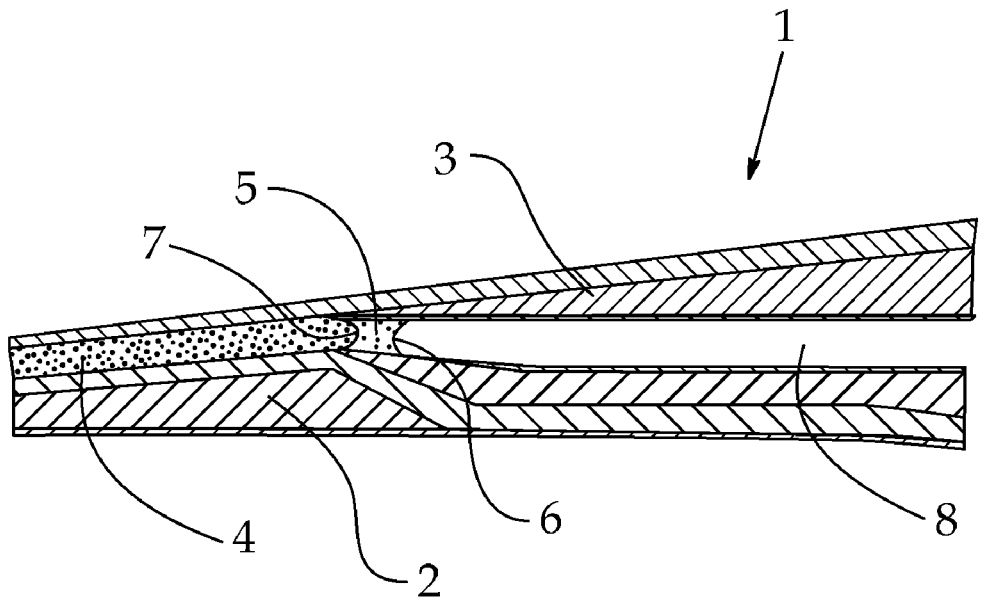
Figure 3:
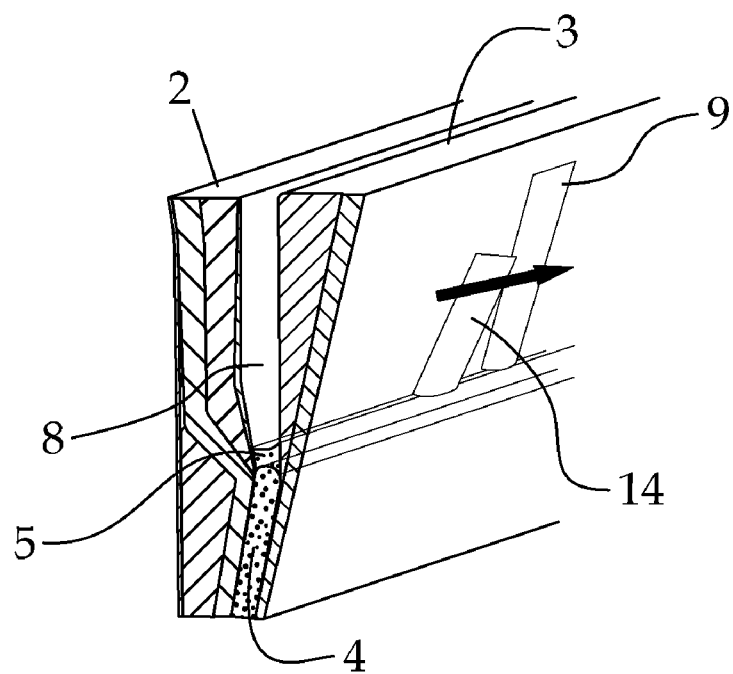

In the following an embodiment of the invention will be described in more detail with a view to the accompanying drawing, in which FIG. 1 illustrates a common wind turbine, FIG. 2 is a cross-sectional view of a trailing edge part of a wind turbine blade according to the invention, and FIG. 3 is a sketch illustrating a method step according to the invention.

DETAILED DESCRIPTION

A common type of modern wind turbine 10 is shown in FIG. 1. The wind turbine 10 comprises a tower 11 with a nacelle 12 on top. The wind turbine 10 comprises a rotor made up of three blades 1 having a root 17 thereof mounted on a hub 13. The wind will actuate the blades 1 of the rotor to thereby make the rotor turn as indicated by the arrow. The hub 13 is connected to a shaft (not shown) in the nacelle 12, and normally the shaft is connected to a generator (not shown) for producing electrical power. The shaft may be connected to the generator through a gear. Each blade 1 comprises a leading edge 15, a trailing edge 16, a root 17 and a tip 18.

FIG. 2 is a cross-sectional view of a trailing edge part of a wind turbine blade 1. The blade 1 comprises a first blade part 2 and a second blade part 3. The blade parts illustrated are two shell parts, however it could also be for example a beam part and a shell part. Each blade part may be made up of a plurality of different materials, e.g. to provide a blade having a smooth outer surface and sufficient strength. The blade parts 2, 3 are firmly connected by a bond 4, which may be formed by a high elastic modulus adhesive (i.e. relatively stiff). The bond 4 is covered by a joint 5 of a low elastic modulus adhesive (i.e. relatively flexible). In the embodiment shown, the bond surface 7 comprises a convex outer surface contour, whereas the joint surface 6 comprises a concave outer surface contour. Reference numeral 8 denotes a cavity between the two shell parts.

The bond may be subject to opening (peeling) stresses. Hence small areas of the bond may witness spikes in load, sometimes above the adhesive capability, which means that the bond may fail. If the bond should fail, it will require maintenance of the blade and standstill of the turbine, which will adversely affect the economy of the wind turbine. However, by covering the bond with a joint of a low elastic modulus adhesive, and the increased flexibility allows for harmful peel stresses to be relieved, and reduces the risk of crack initiation at the start of the high modulus bondline. By shaping the bond surface 7 and the joint surface 6 with mutually inverted radius, the flexibility is further increased.

A method step in the process of manufacturing a wind turbine blade 1 according to the invention is illustrated in FIG. 3, which is a perspective, sectional view of a trailing edge part of the blade. To illustrate the application of the joint, i.e. the low elastic modulus adhesive, the blade part 3 is transparent in the illustration, to show tools in action inside the blade. In the embodiment shown, the joint 5 is applied by a nozzle 9 arranged inside the cavity 8 of the blade, and a shaper tool 14 is swept along the newly applied joint 5 to provide a concave surface contour of the joint 5. Travel of the nozzle 9 and/or shaper tool 14 is illustrated by the arrow. The shaper tool 14 may be an integral part of the nozzle 9 or any other application device, as will be evident to the skilled person.

As will be clear to the skilled person the above description presents only some of the possible embodiments and a variety of different alternatives and supplemental details are indeed possible.

LIST

1. Wind turbine blade
2. First blade part
3. Second blade part
4. Bond
5. Joint
6. Joint surface
7. Bond surface
8. Cavity
9. Nozzle
10. Wind turbine
11. Tower
12. Nacelle
13. Hub
14. Shaper tool
15. Leading edge
16. Trailing edge
17. Root
18. Tip

The invention claimed is:

1. A wind turbine blade, comprising:
  a first blade part; and
  a second blade part, said blade parts being bonded by a high elastic modulus adhesive forming a bond,
  wherein an edge portion of the bond is covered by a low elastic modulus adhesive joint bridging a gap between the first blade part and the second blade part.

2. The wind turbine blade according to claim 1, wherein the joint has a concave surface contour.

3. The wind turbine blade according to claim 1, wherein the bond has a convex surface contour.

4. The wind turbine blade according to claim 1, wherein the bond is arranged at a trailing edge portion of the blade.

5. A wind turbine comprising at least one blade according to claim 1.

6. The wind turbine blade according to claim 1, wherein the edge portion of the bond covered by a low elastic modulus adhesive joint has a convex surface contour, and wherein the joint has a first edge portion facing the convex surface contour of the bond having a concave surface contour and a second edge portion opposite to the first edge portion facing away from the bond also having a concave surface contour.

7. A method for manufacturing a wind turbine blade, the method comprising:
  providing a first blade part and a second blade part;
  bonding the first and second blade parts by a high elastic modulus adhesive to form a bond; and
  covering the bond by a low elastic modulus adhesive joint bridging a gap between the first blade part and the second blade part.

8. The method according to claim 7 wherein the joint is applied using a shaper tool adapted for providing a concave surface contour of the joint.

* * * * *